June 3, 1947.  P. ROBINSON ET AL  2,421,652
ELECTRICAL CONDUCTORS
Filed Aug. 2, 1943  2 Sheets-Sheet 1

PRESTON ROBINSON
STANLEY O. DORST
INVENTORS

BY *Arthur J. Connolly*
ATTORNEY

PRESTON ROBINSON
STANLEY O. DORST
INVENTORS

BY Arthur D. Connolly
ATTORNEY

Patented June 3, 1947

2,421,652

UNITED STATES PATENT OFFICE 2,421,652

ELECTRICAL CONDUCTOR

Preston Robinson, Williamstown, and Stanley O. Dorst, North Adams, Mass., assignors to Sprague Electric Company, North Adams, Mass., a corporation of Massachusetts Application August 2, 1943, Serial No. 496,978

8 Claims. (Cl. 117—128.4)

This invention relates to new and improved electrical conductors and more particularly refers to durable, highly flexible, abrasion-resistant, electrically-insulated conductors possessing certain desirable properties which were heretofore unattainable, and processes for their production and use.

It was well known that refractory, dielectric materials, such as glass, enamels and numerous ceramics, were of particular value in the insulation of electrical conductors. Conductors coated with these materials had excellent dielectric properties. Unfortunately, however, these products had very poor mechanical characteristics. As a result, in ordinary usage the dielectric coating would be broken or weakened, causing failure of the equipment in which it was used. The brittleness and general fragility of these products generally more than offset the desirable electric characteristics thereof.

In order to overcome the foregoing disadvantages various modifications were introduced into the processes whereby refractory coated conductors were produced. For example, it was attempted to improve the mechanical strength of the products by dipping them in solutions or suspensions of resinous materials. Where a concentrated solution or suspension was used the resulting product was thereby given a tough surface coating which, to a certain extent, protected it from surface abrasion. Unfortunately, however, this surface coating had little or no effect on the ability of the relatively fragile ceramic undercoating to withstand flexing or bending; in fact, when products of this type were bent, even to a slight extent, the underlying brittle ceramic coating would rupture and displace itself from portions of the conductor surface, thereby rendering the product unsatisfactory for further use. Where a dilute solution or suspension of resin was used, little or none of it was left on the surface of the coating, and the amount which went into the pores of the ceramic was so small that it was ineffective, particularly after the product was baked.

When it was realized that the problem involved more than mere protection of the surface of the ceramic coating, attempts were made to improve the coating itself. These attempts generally involved the incorporation in the ceramic coating of certain agents such as the hydrated silicates of the bentonite type, or in lieu of such inorganic binders it was suggested that shellac or organic binders might be used. These coatings possess characteristics which constitute a considerable improvement over the prior art previously referred to. Despite this fact, however, their mechanical strength was still inadequate for many purposes and the coatings would rupture when subjected to severe flexing or bending. These coatings were, furthermore, defective in that many types of conductors, such as fine copper wires, could not withstand the high firing temperatures which were necessary to sinter the coating and permanently bond it to the conductor. The shortcomings in the improved coatings just referred to could not, unfortunately, be overcome as suggested, by applying thereto a surface coating of resinous materials. The defect was in the underlying refractory coating, and, as in the case of the older products, the surface coating merely reduced the possibility of damage from surface abrasion.

It has also been suggested that the shellac or organic binders could be completely burned or volatilized from the coating following the deposition of the mixture of refractory and binder. This expedient, however, leaves the refractory coating more porous and fragile than if no shellac or organic binder had been used.

Another defect in the earlier processes was that the resulting coated conductor had weak spots, i. e., spots in which the coating was negligible or too thin to provide proper insulation for the conductor. The usual way for testing coated wire for weak spots was to run the wire through a mercury bath, with the cell containing the mercury and the wire so electrically connected as to provide a complete circuit whenever the mercury touched an exposed portion of the wire surface. In this way the weak spots could be registered in some manner on a chart or similar recording device. However, when the wire was so tested, even if no weak spots in the coating were found, the time, labor and expense involved was large. Further, if the weak spots were to be recoated or removed, additional time, labor and expense was required. Because of these and other heretofore mentioned defects the manufacture of refractory insulated conductors was a time-consuming and expensive operation, and the products were far from satisfactory.

It is an object of this invention to overcome the foregoing disadvantages of the prior art and many other disadvantages which directly or indirectly result therefrom. A further object is to produce an entirely new dielectric coating which possesses all the advantages of prior art coatings without at the same time being subject to their disadvantages. A still further object is to produce coated electrical conductors having dielectric and mechanical properties which were heretofore unobtainable. A still further object is to produce coated electrical conductors which may be used for a wide variety of purposes wherein prior art conductors were of limited value because of their poor flexibility and mechanical strength. A still further object is to produce in one process coated electrical conductors which have no weak spots in the insulating coating. Additional objects will become apparent from a consideration of the following description and claims.

These objects are attained in accordance with the present invention wherein an insulated and physically protected conductor is produced by electrophoretically applying to the surface of the conductor a refractory, dielectric material, treating the so-coated conductor to permanently attach the refractory, dielectric material thereto, then thoroughly impregnating the pores of the resulting coating with a resinous material. In a more restricted sense this invention is concerned with a process whereby an electrically conducting wire is electrophoretically coated with a refractory, dielectric material, a modifying agent and a densifying agent, treating the so-coated wire to permanently attach the refractory, dielectric material, the modifying agent and the densifying agent to each other and to the wire, then electrophoretically depositing a resinous material throughout the pores of the resulting coating. In a still more restricted sense this invention pertains to an electrically conducting wire coated with a refractory, dielectric material and a modifying agent and/or a densifying agent, treating the so-coated wire to permanently attach the constituents of the coating to each other and to the wire, then electrophoretically depositing a resinous material throughout the pores of the resulting coating and treating the coating to render it durable, flexible, abrasion resistant and electrically insulated. In a still more restricted sense this invention pertains to an electrically conducting wire upon the surface of which is electrophoretically deposited a refractory, dielectric material which has been freed of foreign water soluble constituents and a modifying agent and/or a densifying agent, such as a sodium silicate, then treating chemically and/or physically the so-coated wire to permanently bond the coating to the wire, and thereafter electrophoretically depositing a resinous material throughout substantially all of the pores of the resulting coating.

In its preferred embodiment this invention is concerned with a process wherein ceramic materials such as china clay, talc, etc., which have been freed of their foreign water soluble constituents, are incorporated in suspensions, solutions or emulsions containing a modifying and densifying agent such as sodium silicate, potassium silicate and the like, and said materials are electrophoretically deposited upon the surface of a wire or other flexible conductor; then the so-coated wire is treated with chemical agents and/or at elevated temperatures whereby the coating is permanently attached to the conductor. Thereafter, a resinous material or mixture thereof such as polymerized acrylic esters, polymerized vinyl derivatives, silicones, etc., is electrophoretically deposited throughout substantially all the pores of the resulting coating, and treated, if desired, to polymerize or further polymerize said resinous material or mixture thereof. Following this, if desired, the so-coated and treated conductor may be passed through an electrical testing cell containing a suspension or emulsion of resinous material, such as that mentioned above. Whenever a weak or uncoated spot is encountered an additional amount of resinous material will automatically be deposited thereon, completely insulating the coated wire or conductor throughout its entire length and surface.

Other embodiments of this invention are concerned with durable, highly flexible, abrasion resistant, electrically insulated conductors the surfaces of which are coated in part with ceramic materials and in part with continuous layers of resinous materials.

This invention is also directed to the refractory coated conductors produced by the foregoing or related processes, as well as the use of these products in the electrical and other fields.

In accordance with this invention, refractory, dielectric materials, preferably in conjunction with a modifying agent and/or a densifying agent, are electrophoretically deposited upon the surface of wires or other electrical conductors or semi-conductors.

Electrical conductors and semi-conductors suitable for treatment in the foregoing manner are, for example, copper, nickel, nickel-chromium, beryllium-copper, iron-chromium, tantalum-iron-chromium, and the like. In fact, any type of electrically-conducting or semi-conducting wire, plate or bar may be treated in accordance herewith. Materials which do not respond readily to this treatment may be plated with a thin layer of nickel or similar metal, which is especially adapted thereto, before being subjected to the described deposition treatment. This conductor may be circular in cross-section, or may be of any other geometrical cross-section. It may vary from strands of extremely small diameter to wires, rods, bars, or plates of very large size. In place of depositing a refractory material over the entire surface of the wire or other conductor, it may be deposited on only portions thereof, for instance, by masking the remaining portions with a coating of suitable material which may thereafter be removed, such as cellulose, masking tape, waxes, lacquers, etc. This masking material is generally non-conductive and therefore no deposit of refractory dielectric is made upon it. This partial deposition may also, of course, be accomplished by other well known methods.

Refractory materials which may be deposited on the foregoing conductors are extremely varied; for example, they comprise ceramic and/or vitreous materials generally. "Refractory material" whenever used in the present specification or claims is understood to mean "ceramic and/or vitreous materials." A few of the many materials falling within these categories are porcelain enamels, aluminum oxide, iron oxide, beryllium oxide, magnesium oxide, tantalum oxide, vanadium oxide, manganese dioxide, nickel oxide, zinc oxide, molybdenum oxide, tungsten ovide, lead oxide, zirconium oxide, columbium oxide, silicon dioxide, cobalt oxide, chromium oxide, bentonite, china clay, talc, magnesium silicate, aluminum silicate, silicates and insoluble borates of the materials previously referred to as metal oxides, insoluble titanates, tungstates, molybdates, ground mica and related crystalline materials, titanium dioxide in conjunction with another refractory of high negative zeta potential, etc.

These materials may be used alone or in conjunction with one another. Before use they should be ground to small particle size suitable for suspension in a liquid medium in an electrophoretic cell. For this purpose ball-milling to a size of approximately 0.5 to 10.0 microns has been found to be quite satisfactory, although it is not essential that they be within this range. Particle sizes less than 4.0 microns are preferred as a general rule. In order to further facilitate suspension of the foregoing and related refractory particles in a liquid medium in an electrophoretic cell, there may be added thereto assistants such as surface-active agents of the following types: sodium stearate; methyl oleate; sulfonated higher fatty acid amides; soluble salts of sulfuric acid esters of higher fatty alcohols; polyvinyl alcohols and the like. The refractory materials may be ball-milled separately or together, where more than one is employed, but it is preferable to ball-mill them together.

Before use it is advisable to remove all foreign water-soluble materials from the refractory particles. These materials are generally salts and electrolytes which may produce gas in the electrophoretic cell and cause the ceramic coating to be foamy, slimy and quite unsatisfactory. These undesirable constituents may be removed by washing the refractory particles in distilled water or in any other suitable manner.

In order that the refractory coating will possess optimum characteristics, it is advisable to incorporate therewith in the electrophoretic cell, certain modifying agents and/or densifying agents. These agents, as hereinafter described, produce ceramic coatings which are outstandingly superior to coatings produced without them and to coatings known in the prior art.

Modifying agents, upon deposition with and subsequent treatment with the refractory material, produce a coating pronouncedly improved by their presence. Increased flexibility and toughness, and resistance to abrasion and to mechanical failure are the major benefits from their presence. Treatment subsequent to the electrophoretic deposition of the coating is necessary for full derivation of these benefits. This treatment may be of a chemical and/or a physical nature. An example of a modifying agent is sodium silicate, and the benefit from its presence may be obtained by passing the coating through a solution of lead acetate, whereby the sodium ions pass into solution and the lead ions combine with the silicate ions to form an insoluble lead silicate which remains in the coating. The coating may then be heated to temperatures in the range of about 800° C. to about 1000° C., whereby the insoluble lead silicate is probably combined with the refractory material of the coating. A complex and highly stable refractory may thus be obtained. In some cases, when sodium silicate is used as a modifying agent, the chemical treatment or the physical treatment alone is satisfactory. Such a process is described in detail in copending application Serial No. 472,465, filed on January 15, 1943, by Stanley O. Dorst. Another example of a modifying agent is melamine-formaldehyde resin, which is deposited from an emulsion with the refractory material in the electrophoretic cell. The so-coated conductor may then be heated to a temperature sufficient to polymerize the melamine-formaldehyde resin, producing a ceramic coating of desirable characteristics. Ground mica is another example of a modifying agent. Superior coatings have been obtained using ground mica as a modifying agent and subsequently sintering the coated wire, and it is one of the preferred modifying agents. Other modifying agents which can be used are zinc oxide, Formvar, silicone, Corial Bottom, Appretan A, hydrated silicates, polyvinyl alcohol, etc. ("Formvar" is a trade name for synthetic polyvinyl resins; "Corial Bottom" and "Appretan A" are trade names for synthetic acrylic ester resins.) They are subjected, following deposition, to the treatment hereinafter described in order to derive the full benefit therefrom: chemical treatment and/or sintering for the zinc oxide, moderate heat for the resin derivatives, sintering for the hydrated silicates, sintering for the mica and related crystalline materials, moderate heat for the silicone, etc.

Densifying agents aid in producing a dense deposit of the refractory mixture on the conductor during the electrophoretic process. These agents are particularly helpful in that they produce the maximum zeta potential on the refractory particles in suspension thereby greatly facilitating their deposition and improving their subsequent performance. The dense deposits produced with these agents results in a more uniform coating which will resist mechanical damage during plating and before subsequent treating. Further, they prevent fluffy and exceedingly porous coatings from being formed, thereby producing the maximum dielectric value per unit thickness. For these purposes, densifying agents are of extreme value, and it should be understood that their use herein is preferred. These agents are usually electrolytes and generally have monovalent cations and polyvalent anions as, for example, sodium silicate, potassium silicate, and lithium silicate, sodium-, potassium-, lithium phosphates, sodium-, potassium-, and lithium ferrocyanides. In place of sodium, potassium, and lithium ions, other ions, preferably those at the beginning of the Hofmeister series, may be used; or complex monovalent ions, such as benzyl trimethyl ammonium and dodecyl pyridinium, etc. Such compounds produce a high negative zeta potential on the refractory particles.

In cases where a high positive zeta potential is desired, as, for example, when using barium titanates and other metal titanates as refractory materials, thorium salts, such as thorium phosphate can be employed to good advantage.

The densifying agent is selected and added to the refractory mixture in fairly small concentrations. One method used to determine the correct amount to be added is to measure the resistivity of the suspension. Since the densifying agents are generally electrolytes, the resistivity is in direct relationship with their concentration. For use herein it is ordinarily advisable to prepare suspensions possessing a resistance between about 50 and about 2,000 ohms per cubic centimeter. In the case of sodium silicate the preferred resistance range of the suspension is between about 100 and about 1500 ohms per cubic centimeter.

In some cases the agents have both a densifying and modifying function. An example of this is sodium silicate, which has been described heretofore as a modifying agent. Sodium silicate also provides ions which cause the densifying effect and therefore may be used for either or both purposes. Mica and related crystalline materials act as both refractory materials and modifying agents.

It is to be understood that for optimum results over widely varying conditions, with different refractory materials and combinations thereof, both densifying and modifying agents should be employed. It is further to be understood that a plurality of modifying agents and/or a plurality of densifying agents may be used in the electrophoretic cell in order to provide refractory coatings with optimum characteristics.

As in the case of the refractory materials, the modifying agents should be in such form that they will be codeposited from the electrophoretic solution with the refractory material. In the case of inorganic insoluble agents they should be finally ground, for instance, to a fineness of about 600 mesh. In the case of water soluble agents, as, for example, the densifying agents, they should be dissolved in the electrophoretic liquid. In the case of water-insoluble organic agents they should advisably be employed in the form of emulsions. In the case of a mixture of two or more agents they should be employed in the same form as though each material were used separately. For example, if it is desired to use a modifying agent comprising a mixture of sodium silicate and the polyvinyl alcohol derivative sold under the trade name "Formvar," the sodium silicate will be dissolved in the aqueous electrophoretic medium and the Formvar will be present therein as an aqueous emulsion. The manner of emulsifying agents of the previous types is well known; for instance, it may be accomplished by dissolving the resin in an organic solvent, such as benzene, and thereafter vigorously mixing the resulting solution with a large volume of water, in the presence of an emulsifying agent. The emulsifying agent may, of course, be subsequently destroyed if it is detrimental in the finished product.

As a general rule the refractory material, modifying agent and densifying agent will be present in an aqueous medium in the electrophoretic cell. The liquid medium should preferably be distilled water, although other poorly conducting media may be used for this purpose.

For purposes of obtaining an homogeneous suspension and, in some cases, emulsion, it is generally advisable to mix the ingredients well prior to use in the electrophoretic cell. The preferred method for this is to mix the ingredients with half of the total liquid medium in a re-cycling attrition mill, then add the other half of the liquid medium and continue mixing in the attrition mill. However, other suitable means therefor may be used.

In carrying out the invention, the amount of refractory material and the individual constituents thereof as well as the amount of modifying and densifying agents and the individual constituents thereof may be varied widely. The refractory material will, of course, ordinarily preponderate. For example, a suspension of 45% by weight of kaolinite, 45% by weight of talc, 9% by weight of ground mica, and 1% by weight of sodium silicate might be used. In the same manner 40% by weight of china clay, 40% by weight of talc, 19.5% by weight of Formvar and 0.5% by weight of sodium carbonate might be used. As a general rule, it may be stated that the amount of refractory material constitutes about 90% to about 40% by weight of the total, the amount of modifying agent constitutes about 10% to about 50% by weight of the total and the amount of densifying agent constitutes about 0.1% to about 10% by weight of the total.

Upon electrophoretically depositing upon the conductor the mixture of refractory material and modifying and densifying agents, it is advisable to treat the resulting coated conductor in order to permanently attach the coating particles to the base and to each other. The particular type of treatment employed for this purpose will depend to a great extent upon the coating composition used, the characteristics of the base upon which it is deposited, and the use for which the final product is intended.

In the case of a wire which may be subjected to extremely high temperatures without injury, the modifying agent may be, for example, zinc oxide and the densifying agent may be, for example, sodium silicate. The ceramic coating deposited from an aqueous suspension of the aforesaid refractory material and modifying agent, the densifying agent being in solution, may be permanently attached to the base by sintering at elevated temperatures, for example, temperatures on the order of about 1000° C. The proportion of the densifying agent is quite small and the coating undergoes no special treatment for this agent.

In the case of a copper wire, for example, which cannot be subjected to high temperatures without excessive oxide formation, sodium silicate, for example, could be used as both the densifying and modifying agent. The modifying effect could be accomplished by dipping the coated wire in a lead acetate solution; whereby the lead ion would replace the sodium ion of the sodium silicate and form insoluble lead acetate. The wire would then be subjected to a temperature of about 150° C. to remove the moisture.

Before permanently attaching the refractory material to the base by sintering or otherwise it is, of course, to be understood that the coated conductor may be subjected to slightly elevated temperature, for example, on the order of about 150° C., to remove the solvents therefrom. This may be accomplished by simply passing the coated conductor through an oven.

Certain features of the foregoing instructions are described in considerable detail in U. S. Patent No. 2,213,969 and U. S. patent application, Ser. No. 472,465, filed by Stanley O. Dorst on January 15, 1943. It is to be understood, therefore, that the various instructions and details of the aforesaid patent and patent application are applicable to the present invention and when modified in accordance with the foregoing instructions the so-produced refractory coated conductors may be used as such, or preferably treated in the manner described hereinafter.

Coating a wire or other conductor with ground mica and/or related crystalline materials produces an insulated product which, even without the addition of resins, as hereinafter described, possesses superior characteristics. This is probably due to the excellent dielectric properties of these materials and the ease with which the crystal planes slide over one another when the wire is bent.

When the refractory material has been permanently attached to the base it customarily undergoes a deterioration in its mechanical properties which was heretofore generally considered to be of a permanent nature. Its flexibility may be reduced or destroyed entirely and it may be injured by bending or rough handling. For this reason the coated wire or conductor was generally embodied in its final shape before subjecting it to this treatment. Needless to say, this is not always convenient or practical.

In accordance with the present invention, refractory coated wire which has been treated in this manner may be rendered markedly more flexible, durable and abrasion-resistant by thoroughly impregnating the pores of the coating with a resinous material. This treatment, surprisingly enough, converts a coating which may be brittle, inflexible and easily abraded into one which can be bent, twisted, and roughly handled without noticeable injury. In fact, the product is considerably more flexible, abrasion-resistant and workable than it was before the refractory material was attached to the base. This is particularly surprising since it was heretofore assumed that a refractory coated wire possessed maximum flexibility and workability before the refractory coating was attached to the wire by sintering, and that these properties were permanently destroyed by the sintering operation.

In order to achieve this highly desirable objective it is essential that the resinous material be impregnated throughout the pores of the refractory coating. If this material is merely deposited on the surface, as would be the case if a coated wire were dipped in a concentrated solution, emulsion or suspension of a resin, the desired results cannot, as heretofore mentioned, be obtained. In fact, dipping the coating in a solution, emulsion or suspension of a resin has been found to impart thereto negligible improvement in characteristics.

It is therefore understood that in accordance with this invention the coating is flexibilized by depositing throughout the pores thereof a resinous material. In order to thoroughly permeate the pores, electrophoretic deposition of the resinous material is essential, or, as a secondary alternative, the pores may be impregnated with a substantially monomeric material which is then polymerized in situ. This expedient apparently honeycombs the bonded coating with resinous material and seals the refractory particles thereof in place. As a result, when the coating is flexed, bent, twisted, or otherwise distorted, the resinous material appears to act as a cushion which substantially prevents the rupture of the delicate, brittle bonds between particles of the refractory material. Furthermore, to the slight extent that particles may be ruptured from one another, they are held in place by the resin and continue to perform their desired dielectric functions.

Resinous materials which can be used in this connection are natural and synthetic resins such as the acrylic acid derivatives represented by polymerized methyl methacrylate, polyvinyl alcohol derivatives represented by polyvinyl carbazole and the resin sold under the trade name "Formvar," glyptal resins, silicones, polymerized styrene, rubber latex, synthetic rubbers generally, halogenated rubbers, melamine-formaldehyde resin and the like. An illustrative few of these resins is referred to in U. S. patent application, Ser. No. 475.051, filed by Lester A. Brooks on February 6, 1943. These resins may be used either alone or in conjunction with one another, as a plurality of resins frequently permits the desirable characteristics of each to be improved. Likewise these resinous materials may have incorporated therewith one or more plasticizers, such as camphor, dibutyl phthalate and the like. They are advisably electrophoretically deposited from an emulsion thereof. The manner of forming such emulsions, and depositing the same on a conductor from an electrophoretic cell, has been referred to previously with respect to the modifying and densifying agents. Therefore, for the sake of brevity, it will not be referred to again.

While electrophoretic deposition of emulsions of resinous materials is the preferred embodiment hereof, it has been found that excellent, but generally inferior, results can also be obtained if the refractory coated conductor is passed slowly through solutions, emulsions or suspensions of a substantially monomeric material, which can thereafter be polymerized in situ. Materials of this type are monomers or low polymers of the resins or resinous materials referred to previously. Substantially monomeric vinyl carbazole is particularly adapted for this treatment. Thereafter the coating, which has thus been thoroughly impregnated with the monomeric materials, may be subjected to polymerizing conditions to deposit the desired resin throughout substantially all the pores thereof. Polymerization may be accomplished in known manner, for instance, with elevated temperatures in the presence of oxygen or air, and with or without polymerization assistants, such as ultra-violet light, polymerization catalysts which do not reduce the dielectric properties of the coating, represented by peroxides such as benzoyl peroxide, etc.

Electrophoretic deposition of the foregoing and other well-known resins having equivalent properties have many important advantages. For instance, the countless pores of the refractory coating are thereby filled with a material which acts not only as a binder but also as a satisfactory dielectric material per se. Further, it renders it feasible to make an emulsion of a very heavy lacquer which otherwise would be unsuitable, since the low viscosity of the suspending medium allows the particles of resin to penetrate the pores of the ceramic coating. Furthermore, solvents may be removed from the emulsified lacquer, prior to impregnation, by heat and/or vacuum, to produce particles with a minimum of solvent content, thereby assuring more complete impregnation.

It is, of course, to be understood that after impregnation and final treatment of the impregnated coated product, as aforesaid, one or more coats of resin may be applied to the surface thereof, by dipping, spraying or in accordance with other well-known methods. However, due to the outstanding characteristics of the aforesaid coated conductors, this is hardly necessary.

In the case where the coated conductor must be tested and all flaws or weak spots removed, it is preferable to use a method whereby the weak spots are automatically repaired by electrophoretically depositing therein and thereon additional resinous material in a simple and rapid process. This is accomplished by passing the coated conductor through a cell containing an emulsion of the resinous material as described heretofore. However, the electrical circuit is so arranged that electrophoretic deposition occurs only when the emulsion comes in contact with the conductor itself. In this way, the circuit is complete only when a weak spot is encountered and only the weak spots receive the additional deposit. The conductor is subsequently treated as previously explained and the final product is a flawless insulated conductor. It is to be understood that this expedient is necessary only in special instances when the specifications require testing of the insulated conductor for the insulatory properties thereof and require the removal or treatment of weak spots in the insulating coating. Weak spots may be due to variations in coating current, coagulation of particles in suspension and the like.

The impregnated coatings, produced as aforesaid, can now be subjected to practically any conceivable treatment without impairment thereof. They may be shaped into any desired configuration, such as coils, etc. Thereafter, if desired, the resinous material may be removed therefrom, for instance, by subjecting the final product to elevated temperatures. This is not essential since the product will last practically indefinitely, unless in actual operation it is to be regularly subjected to temperatures above the decomposition point of the resin. In such cases a more stable resin could be employed, or the resin could be allowed to burn off in use or be burned off just prior to use. Burning off the resin will further insulate the conductor, probably by the formation of an oxide film on those portions of the conductor surface which were covered by the resin. Regardless of which of the foregoing expedients is used the resin-impregnated product is surprisingly more durable, flexible, abrasion and moisture resistant, and workable than the refractory coated article from which it was made, and even though the resin be subsequently removed therefrom the ultimate article possesses characteristics which are notably superior to those of the original article before impregnation.

Figure 1:
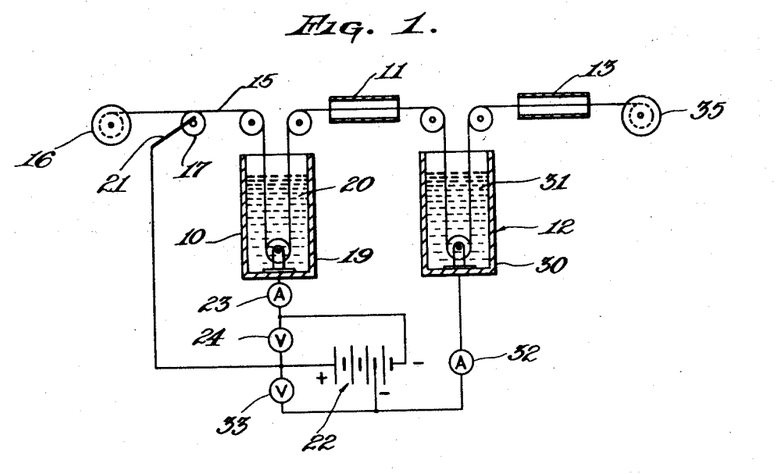
Figure 1 illustrates one form of apparatus suitable for producing electrically insulated conductors in accordance with the invention.

A representative group of refractory coating materials, with and without modifying agents and/or densifying agents, and resin impregnants is set out in the following illustrative examples:

Referring more specifically to Fig. 1, a wire 15 is unwound from a spool 16 and passes on its way to the coating cell 10 around a mandrel 17. Within the cell 10 the wire is initially electrophoretically coated with a refractory insulating material and for this purpose the cell 10 comprises in a container 19 a coating solution 20 consisting of a water suspension of particles of one or more of the refractory ceramic materials above specifically pointed out. The solution 20 preferably also comprises a modifying agent and a densifying agent for the reasons also pointed out above.

Before using the refractory suspension, it should advisably be adjusted to come within certain limits of conductance or resistance. For example, in Table I, Example 1, the resistance of the solution is preferably between 100 and 1500 ohms per cubic centimeter. If sodium silicate is used as the densifying agent, as in Example 2, the resistance is preferably between 90 and 2000 ohms per cubic centimeter. These limits are controlled by the amount of densifying agent present in the suspension medium and should be observed for most effective deposition of the refractory mixture.

Preferably the container 19 itself forms one

| Example | Refractory | Densifying Agent | Modifying Agent | Treatment | Impregnating Emulsion |
|---|---|---|---|---|---|
| 1 | China clay, Talc | Soluble Silicates | Sodium Silicate | Sintering | Formvar. |
| 2 | China clay, Talc (Bentonite). | Sodium Silicate | do | do | Do. |
| 3 | China clay, Talc Zinc oxide. | do | do | Chemical Reaction with phosphoric acid, then sintering. | Silicone. |
| 4 | China clay, Talc | do | Zinc oxide | Chemical Reaction with phosphoric acid. | Vinyl carbazole. |
| 5 | do | do | Sodium Silicate | Chemical Reaction-Lead Acetate. | Melamineformaldehyde. |
| 6 | do | Sodium Carbonate | Melamineformaldehyde | Heat (to polymerize melamine). | |
| 7 | do | Tetrasodium pyrophosphate. | Zinc oxide | Sintering | Formvar. |
| 8 | China clay, Talc (Bentonite). | Sodium Carbonate | | do | Do. |
| 9 | China clay, Talc | do | Polyvinyl alcohol | Dip in formaldehyde | |
| 10 | Mica | Sodium Silicate | Sodium Silicate | Chemical Reaction with Acetate. | Silicone. |
| 11 | do | do | do | Sintering | Do. |
| 12 | do | Tetrasodium pyrophosphate. | Mica [1] | | Do. |
| 13 | do | do | Silicone Emulsion | Heat (to polymerize) | |
| 14 | Porcelain enamel | Sodium Carbonate | Corial B | | |
| 15 | do | do | Appretan A | | |

[1] Mica can be used as its own modifying agent and as a modifying agent for other refractories.

The invention will be further described with reference to the appended drawing, forming part of the specification, in which.

The apparatus illustrated in Fig. 1 comprises a coating cell 10 within which a wire element is initially provided with a refractory insulating coating, an oven 11 for processing the refractory coating, a coating cell 12 for depositing a resinous material substantially throughout the depth of the coating applied in coating cell 11, and an oven 13 for processing the resulting coating.

electrode of the coating cell and for this purpose the container is made of an electrically conducting material such as copper. The wire 15 to be coated forms the other electrode of the cell and electrical connection thereto is provided by a brush 21 which contacts the mandrel 17 and is thus connected to the wire 15.

The current for depositing the coating is supplied by a suitable source of direct current shown as a battery 22 the negative pole of which is connected to the container 19 through an ammeter 23 and the positive pole of which is connected to the contact brush 21. A voltmeter 24 for indicating the coating voltage is connected in shunt across the brush 21 and the container 19.

The current used for the electrophoretic coating in the cell 10 depends for a given coating material on the time of deposition, the length of immersion and speed of the wire in the coating cell and the desired thickness of the coating. For example, when electrophoretically coating nichrome wire 0.0015" in diameter in a coating solution comprising an aqueous suspension of 185 grams per liter of refractory particles of talc and china clay having an average size of 2 microns, which solution also contains 2.7% by weight of zinc oxide as a modifying agent and 0.5% by weight of a 40% solution of sodium silicate as a densifying agent, and when the wire travels at a speed of 120 feet per minute with 2 feet of the wire immersed in the coating solution, a coating 0.0005" thick is produced by a current of 15 milliamperes.

The coated wire is then subjected to a heat treatment within the oven 11 by which the properties of the coating are greatly enhanced. The temperature of the heat treatment in the oven 11 is largely determined by the results desired with respect to the coating material applied in the cell 10. When processing a coating of the above described composition, for example, a temperature of about 1000° C. may be used to sinter the refractory particles and modifying agent. The oven temperature is selected to provide the coating with the best effects from the modifying agent, in combination with a refractory mixture. If the modifying agent requires chemical treatment, the oven will be used only to remove moisture and/or solvents from the coating.

On emerging from the oven 11 the coated wire 15, having been cooled by air, passes into a coating cell 12 within which the pores of the coating are electrophoretically impregnated with a resinous material.

The coating cell 12 is constructed similarly to the cell 10, and the container 30 thereof within which a coating solution 31 is held, is similarly of electrically conducting material and forms the cathode of the coating cell.

The current for electrophoretically impregnating the coating is supplied by the battery 22 to which the container 30 is connected through an ammeter 32, a voltmeter 33 connected across the container 31 and the contact brush 21 indicates the voltage applied to the cell 30.

The current used for the treatment in the cell 12 depends on the degree of impregnation desired in addition to such factors as the constituents of the coating solution, the speed of the wire through the cell, the length of immersion thereof, and the porosity and thickness of the ceramic coating initially applied. When impregnating the coated wire above specifically referred to in a solution consisting of 10% by weight of Formvar lacquer emulsified in distilled water, and traveling at the above given speed with 2 feet of immersion in the coating cell, a current of 5 milliamperes produces a thoroughly impregnated coated wire. By increasing the current to 6 milliamperes there may be provided in addition, a superficial coating of the resin approximately 0.0001" thick.

Thereafter, the impregnated coating is baked and/or polymerized, or further polymerized within the oven 13, such taking place, for example, at a temperature of 440° C. after which the wire is wound on a storage spool 35.

Suitable driving means (not shown) rotate the spools 16 and 35 and move the wire through the coating apparatus.

Figure 2:
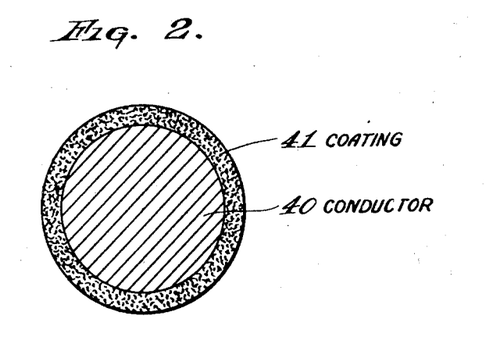
Fig. 2 is a cross-sectional view on an enlarged scale showing a wire conductor provided with an insulating coating in accordance with the invention.

Fig. 2 is an enlarged cross-sectional view of a coated conductor in accordance with the invention. The conductor there shown comprises a wire element 40 and a coating 41 which coating comprises a refractory ceramic constituent uniformly and thoroughly impregnated with a resinous material.

Figure 3:
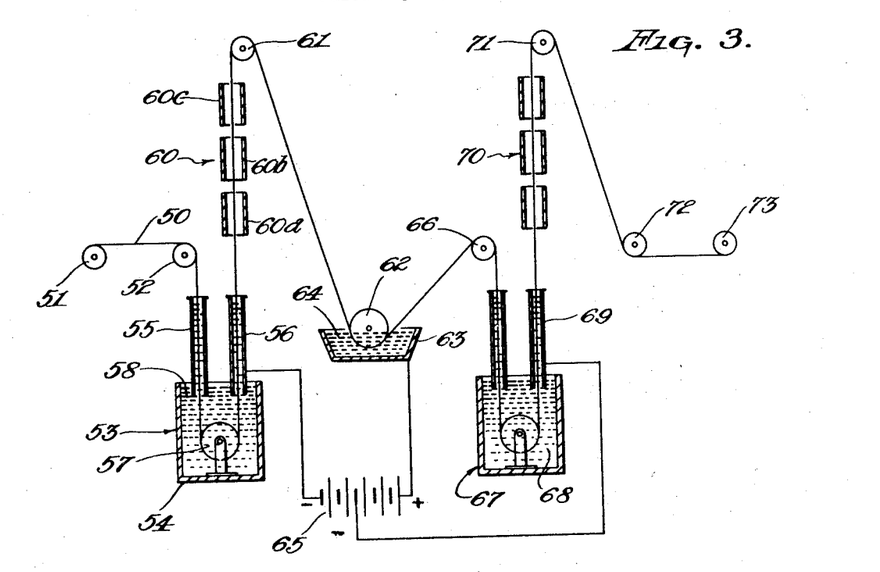
Fig. 3 illustrates a preferred form of apparatus for producing the insulated conductors of the invention.

In the coating apparatus shown in Fig. 3, a wire 50 is unwound from a spool 51 and passes over a guide pulley 52 into a coating cell 53 within which the wire is electrophoretically coated with a refractory insulating material. The cell 53 comprises a closed container 54 having a lead-in duct 55 and a lead-out duct 56 through which the wire 50 passes. Within the container 54 is a pulley 57 for reversing the direction of the wire and within the container and the ducts 55—56 is a coating suspension 58 similar to the coating solution 20 described in connection with the apparatus illustrated in Fig. 1. Duct 56 forms an electrode of the coating cell and for this purpose consists preferably of copper, whereas the other electrode of the cell consists of the wire 50 to which electrical connection is made as later to be more fully described.

Duct 55 and the container 54 consist of glass or may consist of copper, in which case the duct 55, the pulley 57 and the container are electrically insulated from the duct 56. By arranging the coating electrode at the output side of the coating cell and electrically insulating the same from the other components of the coating cell, deposition on the wire prior to the pulley 57 is prevented and a uniform coating is subsequently obtained.

Upon emerging from the duct 56 the wire passes through an oven 60 constructed in three stages 60a, 60b and 60c, whereby the removal of moisture and solvents from the coating applied in the cell 53 and the subsequent baking and sintering of the coating may be precisely controlled.

The so treated coated wire after passing over a pulley 61 is led by another pulley 62 into an open copper trough 63 containing a solution 64 of ammonium hydroxide which penetrates the porous refractory coating and makes electrical connection to the wire. For making connection to a high-resistance wire 50, a solution 64 consisting of .5% to 5% and preferably 1% ammonium hydroxide is used, whereas for copper and low-resistance wires a solution of .5% to 15% ammonium hydroxide is used. The ammonium hydroxide on the coated wire after emerging from the trough 63 readily evaporates and causes no deleterious effects. However, when coating large-size wire, for example of the order of .015" in diameter, a small heating element is preferably positioned adjacent to the wire following the trough 63 to insure complete removal of the ammonium hydroxide.

The coating current for the cell is derived from a suitable D. C. source shown as a battery 65, the positive pole of which is connected to the trough 63 and the negative pole of which is connected to the duct 56. Suitable current and voltage measuring instruments (not shown) are connected in the circuit in similar manner as shown in Fig. 1. The ammonium hydroxide solution may also serve for cleaning the wire surface of grease prior to the coating thereof, in which case the wire 50 passes therethrough prior to its entrance into the coating cell 53 and a relatively strong solution of ammonium hydroxide is used.

From the trough 63 the coated wire passes over a guide pulley 66 into a coating cell 67, which is constructed similar to the coating cell 53 and within which the pores of the coating are electrophoretically impregnated with a resinous material. For this purpose the cell comprises a coating suspension or emulsion 68 corresponding to the coating solution 31 of Fig. 1, and a coating electrode 69 serving as a lead-out duct from the cell and electrically connected to a tap of the direct current source 65.

The so impregnated coated wire is heat-treated within the three-stage oven 70 corresponding to the oven 13 of Fig. 1, and after passing over guide pulleys 71 and 72 is stored on a take-up spool 73.

Figure 4:
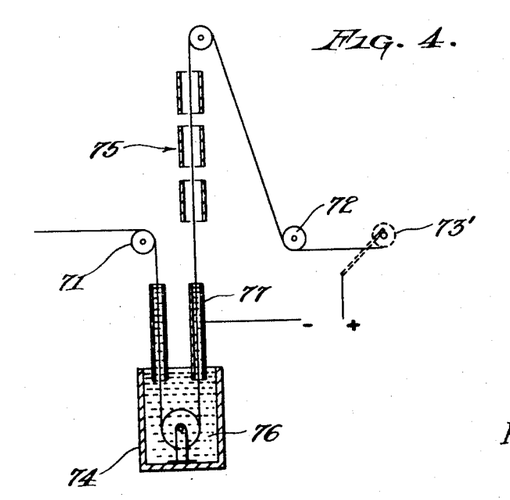
Fig. 4 illustrates one form of apparatus for depositing a resinous material in and on weak spots found in the insulating coating of the conductor.

The apparatus shown in Fig. 4, by which bare or weak spots in the coating are given an additional coating of resinous material, comprises a coating cell 74 similar to the coating cells 53 and 67 and a heat-treating oven similar to the ovens 60 and 70. Cell 74 comprises a resinous coating suspension or emulsion 76 which may be similar to the coating suspension or emulsion 66 of the cell 67 but which if desired may consist of another of the resinous materials above pointed out, and the heat-treatment in the oven 75 is similar to that occurring in the oven 70 and is particularly determined by the specific resinous suspension or emulsion used. A coating electrode 77 similar to electrodes 56 and 69 of cells 53 and 67 constitutes the lead-out duct of the coating cell, such electrode being connected to the negative pole of a direct current supply. The wire to be treated forms the positive electrode. The coating voltage used should be higher than the voltage used in the coating cell 67 to insure breakdown and subsequent coating of weak spots in the coating.

The treatment in the cell 74, which may take place any time subsequent to the manufacture of the impregnated coated wire, preferably takes place immediately after the impregnated coated wire leaves the oven 70, and accordingly the wire is directed through the cell 74 and the oven 75 in its transit between the pulley 71 and the pulley 72, to thereby provide a third coating step for the wire. In such a preferred arrangement electrical connection to the wire provided by the suspension or emulsion 64 in the trough 63 also serves for the coating treatment in the cell 74, in which case the coating electrode 77 is also connected to the current source 65. When the above expedient is not used, suitable connection to the wire must be made, for example, by connecting the end of the wire to a metal take-up spool, indicated in Fig. 4 in dotted lines and numbered 73', against which is applied a suitable electrically conducting brush connected to the positive pole of the coating current source.

The durable, highly flexible, electrically-insulated wires or other conductors or semi-conductors produced in accordance with this invention may be used for a multitude of purposes for which their unusual characteristics render them particularly adapted. They may be used in the manufacture of resistors, electrical transmission lines, electrical transformers, condensers, inductance coils, etc. In general, they may be used wherever insulated wires or other insulated conductors or semi-conductors have heretofore been used or are capable of use. In the non-electrical field they may be used in the manufacture of household screens, metal fences, and related articles wherein their durable coatings permit them to withstand severe weathering and other conditions of use without deterioration. They may also be used in the manufacture of glass substitutes wherein they are first formed into a screen, either before or after the wires are coated as aforesaid, and thereafter the interstices of the screen are filled with a plastic composition by dipping it in a solution of cellulose acetate, cellulose nitrate, polymerized methyl methacrylate, polymerized vinyl derivatives, etc., and thereafter drying the resulting coated product. Another use for which they are suitable is in the manufacture of wire gauze for chemical use, wherein the ceramic coating forms a heat resisting and non-charring coating for the wire generally used. The wire in this case may be coated before or following the formation of the screen gauze. Wherever electrical conductors or semi-conductors are exposed to weathering or conditions of use which require one or more of the characteristics of durability, abrasion resistance, flexibility and/or electrical insulation for protection of the base material, or the proper performance of its intended functions, it is contemplated that the products hereof may be used.

The foregoing invention is also useful in obtaining thin flexible sheets of insulating material. The electrode to be coated in this case may be an endless foil, the surface of which may be pretreated to facilitate removal of the deposited and treated coating. The so-obtained sheets of insulating material may thereafter be used for any of the numerous purposes for which self-sustaining sheets of insulating material have previously been used or are capable of use.

As many widely different embodiments of this invention may be made without departing from the spirit and scope thereof, it is to be understood that the invention is not limited to the specific embodiments thereof except as defined in the appended claims.

We claim:

1. A durable, highly flexible, abrasion resistant, electrically insulated conductor which comprises an electrical conductor to which is permanently attached a sintered refractory dielectric material, substantially all the pores of said dielectric material being impregnated with a synthetic resinous material.

2. A durable, highly flexible, abrasion resistant, electrically insulated conductor which comprises an electrical conductor to which is permanently attached a sintered refractory dielectric material comprising a silicate, substantially all the pores of said dielectric material being impregnated with a synthetic resinous material.

3. A durable, highly flexible, abrasion resistant, electrically insulated conductor which comprises an electrical conductor to which is permanently attached a sintered refractory dielectric material comprising a silicate and bentonite, substantially all the pores of said dielectric material being impregnated with a synthetic resinous material.

4. A durable, highly flexible, abrasion resistant, electrically insulated conductor which comprises an electrical conductor to which is permanently attached a sintered refractory dielectric material comprising zinc oxide, substantially all the pores of said dielectric material being impregnated with a synthetic resinous material.

5. A durable, highly flexible, abrasion resistant, electrically insulated conductor which comprises an electrical conductor to which is permanently attached a sintered refractory dielectric material comprising a silicate and zinc oxide, substantially all the pores of said dielectric material being impregnated with a synthetic resinous material.

6. A durable, highly flexible, abrasion resistant, electrically insulated conductor which comprises an electrical conductor to which is permanently attached a sintered refractory dielectric material comprising a silicate, substantially all the pores of said dielectric material being impregnated with a synthetic polyvinyl resinous material.

7. A durable, highly flexible, abrasion-resistant, electrically insulated conductor to which is permanently attached a sintered refractory dielectric material comprising china clay, talc and bentonite, substantially all the pores of said dielectric material being impregnated with a synthetic resinous material.

8. A durable, highly flexible, abrasion-resistant, electrically insulated conductor to which is permanently attached a sintered refractory dielectric material comprising china clay, talc and bentonite, substantially all the pores of said dielectric material being impregnated with a synthetic polyvinyl resinous material.

PRESTON ROBINSON.
STANLEY O. DORST.

REFERENCES CITED

The following references are of record in the file of this patent:

UNITED STATES PATENTS

| Number | Name | Date |
| --- | --- | --- |
| 333,394 | Clark | Dec. 29, 1885 |
| 2,047,209 | Mueller | July 7, 1936 |
| 2,327,462 | Ruben | Aug. 24, 1943 |
| 2,216,234 | Emig | Oct. 1, 1940 |
| 1,926,407 | Ruben | Sept. 12, 1933 |
| 1,972,162 | Parrott | Sept. 4, 1934 |
| 2,084,825 | Ruben | June 22, 1937 |

FOREIGN PATENTS

| Number | Country | Date |
| --- | --- | --- |
| 465,237 | Great Britain | May 4, 1937 |